United States Patent Office 3,184,486
Patented May 18, 1965

3,184,486
17α-(3-SUBSTITUTED AMINOPROPYL)-17-HY-
DROXYESTRA-3-ONE-STEROIDS AND PROC-
ESS FOR PREPARING SAME
Gerhard R. Wendt, Havertown, and Kurt W. Ledig, Phila-
delphia, Pa., assignors to American Home Products
Corporation, New York, N.Y., a corporation of
Delaware
No Drawing. Filed June 21, 1963, Ser. No. 289,717
5 Claims. (Cl. 260—397.4)

This invention relates to certain novel steroidal compounds and methods for their preparation. It is more particularly concerned with novel 17α-(3-substituted aminopropyl) - 17 - hydroxyestr-4-en-3-ones and 17α-(3-substituted aminopropyl) - 17 - hydroxyestr - 5(10)-en-3-ones and methods for their preparation and use in pharmacy.

The novel compounds of the invention can be represented by the following formula:

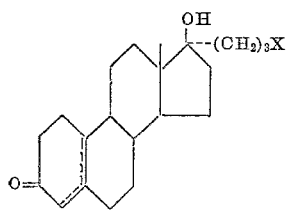

and acid addition salts thereof with pharmaceutically acceptable acids wherein the dotted lines between carbons 4 and 5 and carbons 5 and 10 indicate that these carbon atoms are joined by either a single or double bond, depending upon the bonding of the other, i.e., when the 4(5) bond is a single saturated bond the 5(10) bond is a double unsaturated one, with the converse being true when the 5(10) bond is a saturated single one, and wherein X represents an amino group which is preferably a dialkylamino group such as dimethylamino or diethylamino but which may also be various cyclic amino groups such as morpholino, piperidino, pyrrolidino, hexamethyleneimino and the like which are normally unsubstituted, but which may be lower alkyl substituted to give rise to such amino groups as N-alkyl piperazino, 2-methyl morpholino, 2,2-dimethyl pyrrolidino and the like which we consider to be equivalent to their unsubstituted analogs for the purposes of this particular invention.

The compounds of the present invention are useful for their steroidal activity in the area of cholesterol shifting effect, mild anabolic activity and the like. They are also valuable intermediates for further steroid synthesis by such typical reactions as sodium borohydride reduction of the 3-keto compound to its corresponding 3-hydroxy analog or by other simple transformations into known useful steroids. Their use extends as well to the field of experimental pharmacology where they may serve in a comparative role in the evaluation of other cholesterol shifting and anabolic agents. In addition to the uses enumerated above the compounds are useful for their general hormonal effects in mammals. In this regard the antinflammatory activity of such members of the series as d-17α-(3-diethylaminopropyl)-17-hydroxyestr-5(10)-en-3-one is noted and thus would be expected to exhibit utility in those areas where such agents are normally employed to minimize local tissue reaction produced by chemical and physical irritants.

The novel compounds illustrated above can be formulated and administered to mammals for any of the uses noted in a wide variety of oral or parenteral dosage forms singly or in admixture with other active compounds. When contemplated for use in pharmaceutical products they may be admixed and administered in combination with a large number of compatible diluents, carriers, and the like to form a pharmaceutical composition. Such well-known liquid carriers as water mineral or vegetable oil or a lower non-toxic aliphatic alcohol may be used where injectables are to be prepared. Glycerine or a similar substance may be used where the compound is to be administered as a syrup. Solid excipients, binder, extenders and carriers such as carboxymethylcellulose, starches, sugars and the like may be added where tablets or powders are to be employed as a means of administration. The dosage of the compounds will vary with the severity of the ailment and in general can vary from about 0.5 to 100 mg./kilo of body weight per day depending upon the many factors of the case involved.

The novel compounds of the invention can for the most part be prepared in the manner illustrated by the following reaction scheme:

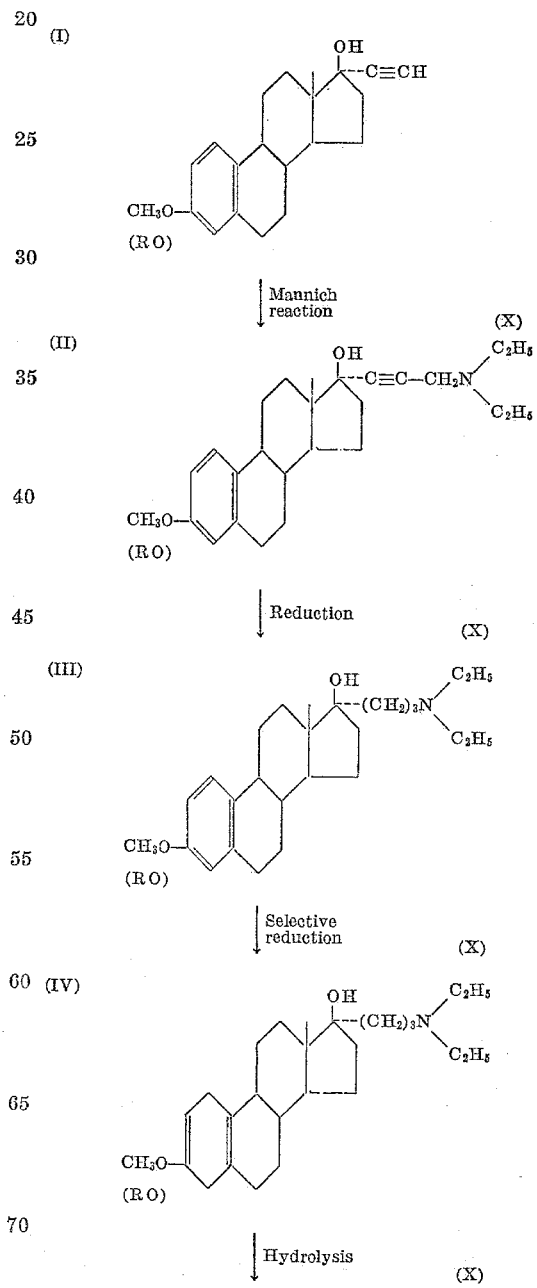

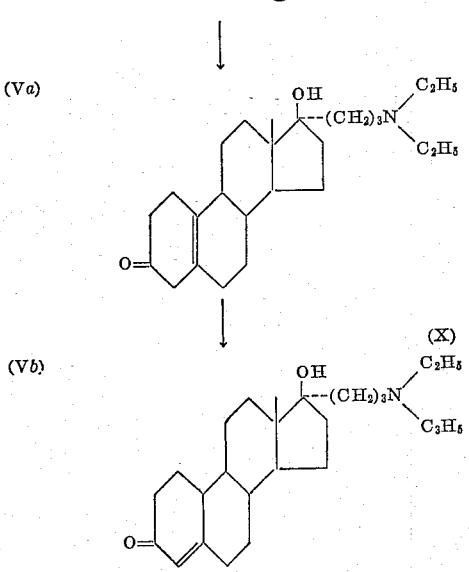

In the above reaction scheme it is to be understood that although for purposes of illustration R and X have been assigned specific values their scope is as depicted in the definition of the novel series of compounds as set out hereinbelow. Moreover although compounds (I) to (III) are described in the flowsheet for completeness of description of our preferred mode of preparation they in fact do not compose part of the invention claimed herein. Compound I is a known material and compounds II and III are described and claimed in our copending application Serial No. 278,789, filed May 13, 1963, wherein R is either lower alkyl, cycloalkyl, aralkyl or the like.

In the method illustrated above the known starting material 3 - methoxy-17α-ethynyl-estra-1,3,5(10)-trien-ol (I) is subjected to a typical Mannich reaction to obtain the Mannich base 17α-(3-diethylamino-1-propynyl)-3-methoxyestra-1,3,5(10)-trien-17-ol (II). Reduction of (II) with a suitable reducing agent gives the compound 17α-(3-diethylaminopropyl)-3-methoxyestra - 1,3,5(10)-trien-17-ol (III). Now by further reduction of (III) with a selective reducing agent preferably lithium in liquid ammonia the aromatic A-ring of (III) is partially reduced to form the corresponding 1,4-dihydro analog (IV). Treatment of (IV) with a suitable acid agent such as oxalic acid in aqueous methanol to hydrolyze the compound effects a transformation into 17α-(3-diethylaminopropyl)-17-hydroxyestr - 5(10) - en - 3 - one (Va) which when treated with methanolic sodium hydroxide gives the final product 17α-(3-diethylaminopropyl)-17-hydroxyestr-4-en-3-one (Vb) which is purified by conventional techniques.

Some specific compounds falling within the broad concept of the invention may be noted for example 17α-(3-diethylaminopropyl)-17-hydroxyestr-4-en-3-one; 17α-(3-morpholinopropyl)-17-hydroxyestr-4 - en - 3-one; 17α-(3-pyrrolidinopropyl)-17-hydroxyestr-4-en-3-one; 17α-(3-diethylaminopropyl)-17-hydroxyestr - 5(10)-en-3-one; 17α-(3-morpholinopropyl)-17-hydroxyestr - 5(10) - en-3-one; 17α-(3-pyrrolidinopropyl)-17-hydroxyestr - 5(10) - en-3-one; 17α-(3 - dimethylaminopropyl)-17-hydroxyestr-4-en-3-one; 17α-(3-dimethylaminopropyl) - 17 - hydroxyestr-5(10)-en-3-one; 17α - (3 - piperidinopropyl)-17-hydroxyestr-4-en-3-one; 17α-(3-piperidinopropyl)-17-hydroxyestr-5(10)-en-3-one; 17 α [3 - (2 - methylmorpholino)propyl] 17-hydroxyestr-4-en-3-one; 17α-[3-(2-methylmorpholino)propyl]-17-hydroxyestr-5(10)-en-3 - one; 17α-[3-(2,2-dimethylpyrrolidino)propyl]-17-hydroxyestr-4 - en - 3-one; 17α-[3-(2,2-dimethylpyrrolidino)propyl] - 17 - hydroxyestr-5(10)-en-3-one; 17α-(3-N-methylpiperazinopropyl)-17-hydroxyestr-4-en-one; 17α-(3-N-methylpiperazinopropyl)-17-hydroxyestr-5(10)-en-3-one; 17α-(3-hexamethyleneiminopropyl)-17-hydroxyestr-4-en-3-one; 17α-(3-hexamethyleneiminopropyl) - 17 - hydroxyestr-5(10)-en-3-one and the like which would be expected to exhibit characteristics equivalent to the compounds typified by the several examples set forth hereinbelow.

It is of course to be understood that the several examples of the preparation of selected members of the series are given purely by way of illustration and are not intended to limit the scope of the invention in any manner. For a legal definition of the scope of the invention disclosed herein attention may be directed only to the several claims appended hereto.

EXAMPLE 1

*d-17α-(3-diethylaminopropyl)17-hydroxyestr-5(10)-en-3-one*

Treat a solution of 4.0 g. of *d*-17α-(3-diethylaminopropyl)-3-methoxyestra-1,3,5(10)-trien-17-ol in 300 ml. of liquid ammonia and 100 ml. of 1-methoxy-2-propanol with 4.0 g. of lithium for 30 min. Add 8.0 g. of ammonium chloride, then water, filter off the 1,4-dihydro compound; yield 3.0 g.; I.R. 5.9 6.0μ; U.V. essentially no absorption at 280 mμ.

Stir a suspension of 1.5 g. of the 1,4-dihydro compound, 2.0 g. of oxalic acid dihydrate, 20 ml. of water, and 100 ml. of methanol under nitrogen for 2 hrs. and dilute the resulting clear solution with water. Extract with ether. Make basic aqueous layer with 10% sodium hydroxide and extract with ether. Wash the ether extracts with water, brine, and dry over magnesium sulfate. Evaporate the resulting crystalline material and recrystallize from acetone-petroleum ether to give 600 mg. of *d*-17α-(3-diethylaminopropyl) - 17 - hydroxyestr-5(10)-en-3-one; M.P. 130–132°; I.R. 2.95; 5.87μ.

*Analysis.*—Calcd. for $C_{25}H_{41}NO_2$: C, 77.47%; H, 10.67%; N, 3.61%. Found: C, 77.18%; H, 10.74%; N, 3.64%.

EXAMPLE 2

*d-17α-(3-morpholinopropyl)17-hydroxyestr-5(10)-en-3-one*

Substitute *d*-17α - (3-diethylaminopropyl)-3-methoxyestra - 1,3,5(10)-trien-17-ol by *d*-17α-(3-morpholinopropyl)-3-butoxyestra-1,3,5(10)-trien-17-ol and proceed as described in Example 1. *d*-17α-(3-morpholinopropyl)-17-hydroxyestr-5(10)-en-3-one is obtained.

EXAMPLE 3

*d-17α-(3-pyrrolidinopropyl)-17-hydroxyestr-5(10)-en-3-one*

Substitute *d* - 17α-(3-diethylaminopropyl)-3-methoxyestra - 1,3,5(10)-trien-17-ol by *d*-17α-(3-pyrrolidinopropyl)-3-cyclopentyloxyestra-1,3,5(10)-trien-17-ol. *d*-17α-(3-pyrrolidinopropyl)-17-hydroxy-estr-5(10)-en-3-one is obtained when following the method set forth in Example 1.

EXAMPLE 4

*d-17α-(3-diethylaminopropyl)-17-hydroxyestr-4-en-3-one and its citrate*

Treat a solution of 2.2 g. of *d*-17α-(3-diethylaminopropyl)-17-hydroxyestr-5(10)-en-3-one in 25 ml. of methanol with 5 ml. of 10% sodium hydroxide for 1.5 hrs. Then add water and collect the product with ether. Wash the ether with water, brine, and finally dry over magnesium sulfate to yield on evaporation 2.0 g. of crude product. I.R. 2.95, 3.25, 5.98μ.

Treat a solution of 2.0 g. of the material in 100 ml. of ether with 2.0 g. of citric acid hydrate in 1.1 of ether. Filter off precipitate, wash with ether to yield 2.2 g. of *d*-17α - (3-diethylaminopropyl)-17-hydroxyestr-4-en-3-one, citrate (containing 0.5 mole of water of crystallization); $[\alpha]_D^{24} = +11.5°$, which is the product of this example.

*Analysis.*—Calcd. for $C_{31}H_{50}NO_{9.5}$: N, 2.38%. Found: N, 2.48%.

EXAMPLE 5

*d-17-(3-morpholinopropyl)-17-hydroxyestr-4-en-3-one*

Substitute *d* - 17α-(3-morpholinopropyl)-17-hydroxyestr-5-(10)-en-3-one for the starting material *d*-17α-(3-diethylaminopropyl)-17-hydroxyestr-5(10)-en-3-one disclosed in preceding Example 4 using the same method described therein. The compound *d*-17α-(3-morpholinopropyl)-17-hydroxyestr-4-en-3-one is obtained as the product of this example.

EXAMPLE 6

*d-17α-(3-pyrrolidinopropyl)-17-hydroxy-estr-4-en-3-one*

Substitute the starting material *d*-17α-(3-pyrrolidinopropyl)-17-hydroxyestr-5(10)-en-3-one for the starting material disclosed in Example 4 and follow the same procedure set forth therein. The product of this example, namely *d* - 17α-(3-pyrrolidinopropyl)17-hydroxyestr-4-en-3-one will be obtained.

EXAMPLE 7

*d-17α-(3-piperidinopropyl)-17-hydroxyestr-5(10)-en-3-one*

Substitute the starting material *d*-17α-(3-pyrrolidinopropyl)-3-cyclopentyloxyestra-1,3,5,(10)-trien-17-ol for the starting material employed in Example 1 but employing the same method as disclosed in that example the compound of this example will be obtained.

EXAMPLE 8

*d-17α-(3-piperidinopropyl)-17-hydroxyestr-4-en-3-one*

Substitute the starting material *d*-17α-(3-piperidinopropyl)-17-hydroxyestr-5(10)-en-3-one for the starting intermediate disclosed in preceding Example 4 but follow the same procedure of preparation set forth therein. The product of this example, namely *d*-17α-(3-piperidinopropyl)-17-hydroxyestr-4-en-3-one will be obtained.

We claim:

1. A compound selected from the group consisting of 17α - (3-substituted-aminopropyl)-17-hydroxyestr-4-en-3-ones, 17α - (3-substituted aminopropyl)-17-hydroxyestr-5(10)-en-3-ones, and non-toxic acid addition salts thereof.

2. A compound selected from the group consisting of those of the general formula:

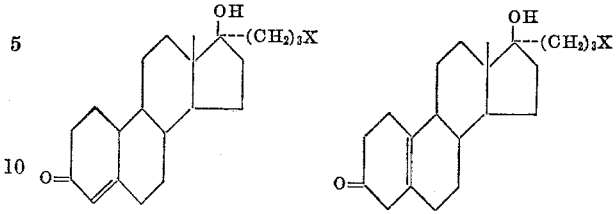

wherein X represents an amino group selected from the group consisting of dialkylamino, morpholino, pyrrolidino, and piperidino, and the non toxic acid addition salts thereof.

3. 17α - (3-diethylaminopropyl)-17-hydroxyestr-5(10)-en-3-one.

4. 17α - (3-diethylaminopropyl)-17-hydroxyestr-4-en-3-one.

5. A method for preparing the compound of claim 1 which comprises reacting under Mannich reaction conditions formaldehyde and a secondary amine with a starting material of the general formula

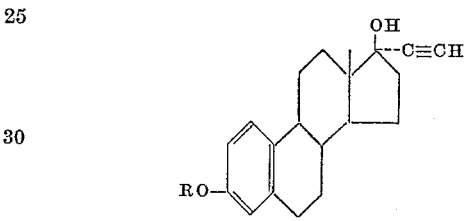

wherein R is selected from the group consisting of a lower alkyl group, cycloalkyl group, aralkyl group with formaldehyde and a secondary amine, reducing with hydrogen in the presence of palladium on charcoal the product thus formed first to remove the acetylenic bond and later to partially reduce with lithium in liquid ammonia the aromatic A ring and finally hydrolyzing the 1,4 dihydro compound to its 3-keto analog.

No references cited.

LEWIS GOTTS, *Primary Examiner.*